(12) United States Patent
Berns et al.

(10) Patent No.: US 7,532,393 B2
(45) Date of Patent: May 12, 2009

(54) MICROSCOPE IMMERSION FLUID APPLICATOR

(75) Inventors: Michael W. Berns, Bonsall, CA (US); Elliot L. Botvinick, Carlsbad, CA (US); Craig Rappaport, San Marcos, CA (US)

(73) Assignee: The Regents of the University of California, Oakland, CA (US)

( * ) Notice: Subject to any disclaimer, the term of this patent is extended or adjusted under 35 U.S.C. 154(b) by 331 days.

(21) Appl. No.: 11/425,336

(22) Filed: Jun. 20, 2006

(65) Prior Publication Data

US 2006/0291041 A1 Dec. 28, 2006

Related U.S. Application Data

(60) Provisional application No. 60/692,862, filed on Jun. 22, 2005.

(51) Int. Cl.
*G02B 21/00* (2006.01)

(52) U.S. Cl. ........................................ 359/384; 359/665

(58) Field of Classification Search ........................ None
See application file for complete search history.

(56) References Cited

U.S. PATENT DOCUMENTS

| 3,202,049 A | * | 8/1965 | Bond ........................ 359/660 |
| 6,133,561 A | * | 10/2000 | Toshimitsu et al. ...... 250/201.3 |
| 2004/0263961 A1 | * | 12/2004 | Hummel ..................... 359/391 |

\* cited by examiner

*Primary Examiner*—Stephone B. Allen
*Assistant Examiner*—Derek S. Chapel
(74) *Attorney, Agent, or Firm*—Vista IP Law Group LLP

(57) ABSTRACT

A microscope fluid applicator includes an immersion fluid reservoir for storing immersion fluid and an applicator tip coupled to the immersion fluid reservoir. The microscope fluid applicator is releasably engaged to a moveable turret on a microscope. The microscope fluid applicator may be secured to an objective lens port on a turret of a microscope via threads. Immersion fluid is ejected from the applicator tip onto a sample holder. The turret may be rotated to place an immersion fluid objective into the immersion fluid. The sample may then be viewed through the immersion fluid. Any excess immersion fluid that is dispensed from the applicator tip may be collected in a fluid collector to prevent contamination of the microscope optics and other components.

20 Claims, 2 Drawing Sheets

MICROSCOPE IMMERSION FLUID APPLICATOR

REFERENCE TO RELATED APPLICATIONS

This Application claims priority to U.S. Provisional Patent Application No. 60/692,862 filed on Jun. 22, 2005. U.S. Provisional Patent Application No. 60/692,862 is incorporated by reference as if set forth fully herein.

FIELD OF THE INVENTION

The field of the invention generally relates to microscopic devices and methods. More specifically, the invention relates to an immersion fluid applicator for fluid immersion microscopy.

BACKGROUND OF THE INVENTION

Microscopes often employ an immersion fluid during optical imaging. The immersion fluid (e.g., oil or the like) increases the index of refraction (as compared to air), thereby increasing the resolution of the resulting image. Conventional microscopes include complicated and cumbersome stage holders that allow for removal of a sample, delivery of immersion fluid, and replacement of the sample. Current microscopic devices that allow for replacement of immersion fluid are expensive and often minimally effective. The problem of immersion fluid loss due to shear (from rotating microscope objectives) and surface tension is particularly acute during large area scans.

For example, in many applications, samples are contained in well plates (e.g., 96 well plates) that are scanned by one or more objectives located on an inverted microscope. Immersion fluid is manually placed or interposed between the objective lens and the sample container (e.g., well plate). When the immersion fluid is lost during the scanning operation, an operator manually replaces the immersion fluid. Typically, this is done by placing a dropper or bottle tip in the small gap located between the objective lens and the specimen holder. Unfortunately, it is difficult for the operator to place the immersion fluid within this small space or gap. In addition, this process is inherently risky because during the replacement process it is possible to overfill the space with too much fluid, thereby causing spillage of the immersion fluid onto non-immersion fluid optics. In addition, fluid droppers and immersion fluid bottles are difficult to manage and often get coated by the immersion fluid which eventually finds its way onto a user's hands and/or gloves and ultimately onto the microscope optics. Moreover, conventional replacement of immersion fluid is problematic because the sample or specimen may not be moved to its original position or location after re-loading of the immersion fluid. Finally, because this process is a manual operation, the replacement of immersion fluid can significantly slow the speed at which samples may be scanned and may be a potential bottleneck for the overall imaging process.

There thus is a need for an immersion fluid applicator and method that is capable of easily and reliably placing immersion fluid between a microscopic objective lens and a sample holder. The system and method may be implemented without using the cumbersome droppers and bottles that have heretofore been used. In one preferred aspect of the invention, the immersion fluid applicator may be automatically controlled to place immersion fluid between a microscopic objective lens and a sample holder. There is a further need for an immersion fluid applicator that is able to reduce the overall amount of time required to replace lost or used immersion fluid.

SUMMARY OF THE INVENTION

In a first aspect of the invention, a microscope fluid applicator includes an immersion fluid reservoir for storing immersion fluid, an applicator tip coupled to the immersion fluid reservoir, and means for securing the immersion fluid reservoir to a moveable turret (automatically moveable or manually moveable) on a microscope. The means for securing the immersion fluid may include, for example, threads or the like.

In another aspect of the invention, a microscope includes a turret having a plurality of objective lens ports therein. A microscope fluid applicator is located in one of the objective lens ports. The microscope fluid applicator includes an immersion fluid reservoir for storing immersion fluid, an applicator tip coupled to the immersion fluid reservoir, and means such as threads for securing the immersion fluid reservoir to a moveable turret on a microscope.

In another aspect of the invention, a microscope fluid applicator for use with a microscope includes an immersion fluid reservoir for storing immersion fluid. An applicator tip is coupled to the immersion fluid reservoir. The microscope fluid applicator is releasably engageable with a moveable turret on the microscope. For example, the microscope fluid applicator may be screwed into a port on the turret that is typically used for microscope objectives. The microscope fluid applicator may contain threads so the same can be readily loaded and un-loaded onto the turret.

In still another aspect of the invention, a microscope includes a moveable turret having a plurality of objective lens ports therein. A microscope fluid applicator is adapted for mounting in one or more of the objective lens ports. The microscope fluid applicator includes an immersion fluid reservoir for storing immersion fluid, an applicator tip coupled to the immersion fluid reservoir, and a threaded portion for securing the immersion fluid reservoir to the moveable turret on the microscope.

In yet another aspect of the invention, a method of applying immersion fluid to a sample holder for viewing with a microscope includes loading a microscope fluid applicator into a moveable turret of the microscope, the microscope fluid applicator containing immersion fluid therein. The moveable turret is rotated so as to position the microscope fluid applicator adjacent to the sample holder. Immersion fluid is then dispensed from the microscope fluid applicator onto the sample holder. The turret may then be moved (e.g., rotated) to position an immersion fluid objective over the sample holder.

DETAILED DESCRIPTION OF THE PREFERRED EMBODIMENTS

Figure 1:
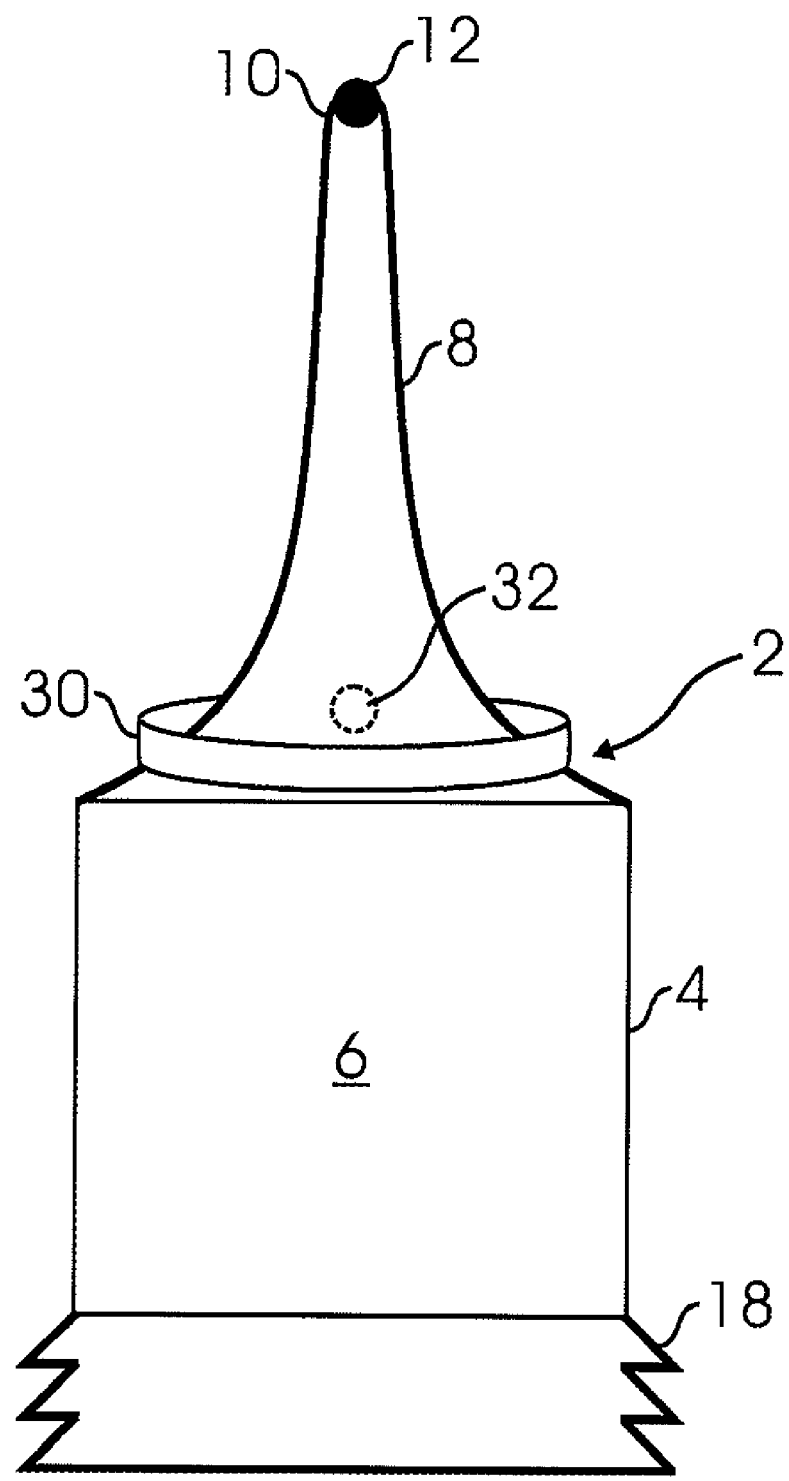
FIG. 1 illustrates a microscope fluid applicator according to one aspect of the invention.
Figure 2A:
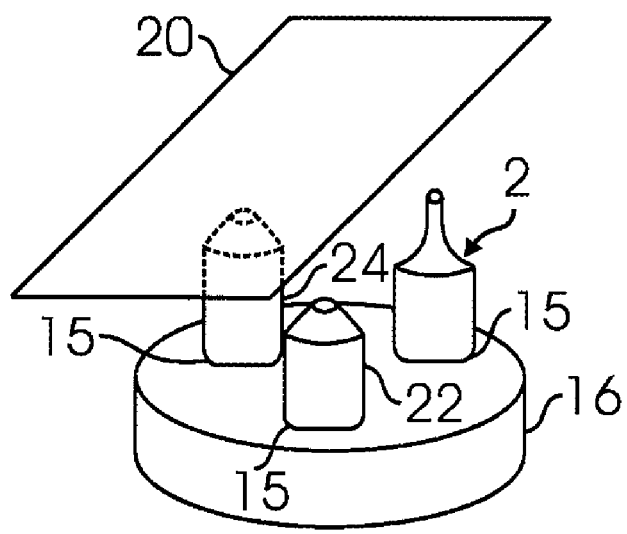
FIG. 2A illustrates a microscope turret having an air objective, an immersion fluid objective, and a microscope fluid applicator. The air objective is shown adjacent to a sample holder.
Figure 2B:
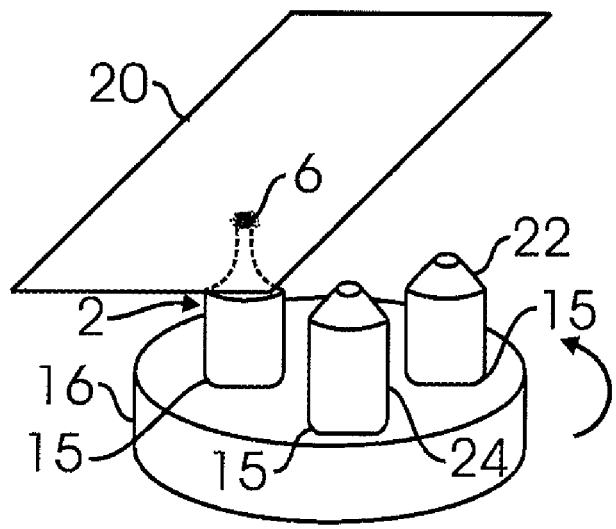
FIG. 2B illustrates a microscope turret having an air objective, an immersion fluid objective, and a microscope fluid applicator. The microscope fluid applicator is shown adjacent to a sample holder.
Figure 2C:
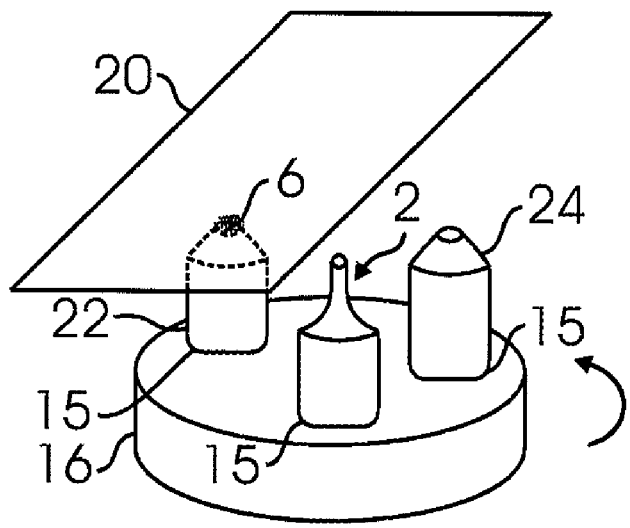
FIG. 2C illustrates a microscope turret having an air objective, an immersion fluid objective, and a microscope fluid applicator. The immersion fluid objective is shown adjacent to a sample holder.

FIG. 1 illustrates a microscope fluid applicator 2 according to one aspect of the invention. The microscope fluid applicator 2 includes an immersion fluid reservoir 4 for storing immersion fluid 6 such as oil, water, or glycerin. An applicator tip 8 is coupled to the immersion fluid reservoir 4. The applicator tip 8 may be tapered in the shape of a "beak" or the like that terminates in a distal tip 10. For example, the "beak" may comprise a long, thin tube that is designed to minimize air bubbles in the system. In addition, the "beak" may be formed to control the flow rate and to control the fluid drop size that emerges from the applicator tip 8. Of course, the applicator tip 8 need not necessarily have a beak-like shape. Other geometrical shapes and cross-sectional profiles are contemplated to fall within the scope of the invention. The distal tip 10 may be a pressure-sensitive tip such as those that operate in ball point or gel-type pens. In this regard, a ball valve 12 or the like may be located in the distal tip 10 to modulate the flow of immersion fluid 6 from the applicator tip 8. For example, contact of the ball valve 12 (or the like) with a sample holder 20 (as shown in FIGS. 2A-C) will cause immersion fluid 6 to flow (either due to one or more of: gravitational forces, pressure, capillary forces, or other wicking force) onto the sample holder 20. Other delivery modalities can also be realized. For example, the delivery of fluid 6 may be initiated by contact of the distal tip 10 with, for example, a cover slip on the sample holder 20.

In one optional aspect of the invention, the applicator 2 may be moveable relative to the sample holder 20. For example, the applicator 2 and/or sample holder 20 may be moveable in a vertical (or substantially vertical) direction such that size of the gap between the applicator tip 8 and the sample holder 20 may be adjusted. Either one or both of the sample holder 20 or applicator 2 (or turret 16 as described below) may be coupled to an adjuster that controls the size of the gap. For example, the adjuster may be a manually adjuster such as a knob, slide, or the like. Alternatively, the adjuster may be an automatically controlled motor or driver.

The applicator 2 may include a location sensing mechanism that identifies the proximity of, for example, the microscope stage or cover slip. For example, a precision encoder, laser-based sensor, or the like may detect the presence or position of the distal tip 10 with respect to the sample holder 20. When the distance between the distal tip 10 of the applicator 2 and the sample holder 20 (or cover slip or stage) reaches a certain threshold distance, a pump or similar dispensing device may be actuated to dispense immersion fluid 6.

In an alternative configuration, the immersion fluid 6 is pressurized, for example, by a pressurized gas or liquid which is located behind or proximal to the immersion fluid 6. When the distal tip 10 (or valve contained therein) comes into contact with the surface of sample holder 20 (shown in FIG. 2B), immersion fluid 6 is delivered to the surface of the sample holder 20 to replenish immersion fluid 6 to the gap or space formed between the sample holder 20 and any objective lens (described below).

It should be understood that the sample holder 20 may include a slide, cover slip, or array of wells (e.g., a 96 well plate or the like). Alternatively, the immersion fluid 6 is pressurized only when the distal tip 10 of the applicator 2 engages with a sample holder 20. In this regard, the pressure is self-generated by the applicator 2 upon engagement with the holder 20. For example, plunger (not shown) or the like situated within the immersion fluid reservoir 4 may be coupled to an actuator that is depressed or otherwise triggered when the distal tip 10 of the applicator 2 is adjacent to the sample holder 20. For example, the actuator may physically touch the sample holder 20. Further movement of the actuator may trigger the release of immersion fluid 6 from the immersion fluid reservoir 4.

The microscope fluid applicator 2 further includes an interface for securing the microscope fluid applicator 2 to a moveable turret 16 on a microscope (shown in FIGS. 2A-2C). In one aspect of the invention, the immersion reservoir 4 contains threads 18 such that the microscope fluid applicator 2 may be screwed into the objective lens port(s) of the microscope turret 16. Of course, other means to secure the microscope fluid applicator 2 may also be used such as clips or other retaining members.

Still referring to FIG. 1, the microscope fluid applicator 2 may optionally include a fluid collector 30 for collecting excess immersion fluid 6 that may be ejected from the applicator 2. The fluid collector 30 may take the form of a lumen, dam, well or the like (a dam is shown in FIG. 1) that prevents immersion fluid 6 from contacting other areas of the microscope. For example, excess immersion fluid 6 may run down the side of the applicator tip 8 to be collected in the fluid collector 30. In another aspect, a port or lumen 32 may drain back into an internal reservoir. In another example, the microscope fluid applicator 2 may contain multiple fluid reservoirs. For example, one reservoir may contain immersion fluid 6 while another reservoir contains a rinsing fluid which can flow out of the applicator 2 and pick-up excess oil from the sample holder 20 and flow back into the fluid collector 30.

In one aspect of the invention, the microscope fluid applicator 2 may contain two lumens or chambers, one of which houses the immersion fluid reservoir 4 or cartridge and a second which collects any excess immersion fluid 6 which may flow from the applicator tip 8.

The microscope fluid applicator 2 may be used on either an upright or inverted microscope. One or more portions of the microscope fluid applicator 2 may be disposable. For example, the applicator 2 may include a housing or the like which includes threads 18 for engaging a microscope turret 16. A disposable bottle or cartridge (e.g., fluid reservoir 4) may be screwed or otherwise inserted into the housing. The disposable bottle or cartridge may incorporate an applicator tip 8 which may or may not be disposable. Alternatively, the entire microscope fluid applicator 2 may be disposable.

During operation of the microscope fluid applicator 2, a user may load the applicator 2 into an existing objective lens port 15 on a turret 16 of a microscope. FIGS. 2A-2C illustrate one such microscope fluid applicator 2 loaded on a turret 16 containing an immersion fluid objective 22 and an air objective 24. In this configuration, the air objective 24 may be used to first scan a sample or specimen loaded onto a sample holder 20 at a low resolution. Prior to switching to the higher resolution fluid objective 22, the air objective 24 is rotated away from the sample holder 20 to bring the microscope fluid applicator 2 adjacent to the sample holder 20 (as shown in FIG. 2B). Immersion fluid 6 is then dispensed from the applicator 2 onto the sample holder 20 using one of the techniques described above. After immersion fluid 6 has been dispensed, the turret 16 is rotated once again to place the fluid objective 22 adjacent to the sample holder 20 such that immersion fluid 6 is interposed between the fluid objective 22 and the sample holder 20 (shown in FIG. 2C). The sample or specimen can now be viewed at higher resolution. It should be understood, however, that the invention described herein is not limited to applications having a first low-resolution air scan followed by a later higher-resolution immersion scan.

The microscope fluid applicator 2 takes advantage of the low tolerance engineering common to laboratory grade microscopes. In these microscopes, particularly automated designs, each objective in the turret 16 can be rotated into place with high precision and repeatability of alignment so that the specimen stays centered each time the objective (e.g., turret 16) is rotated out of place and returned to its original position.

As best seen in FIGS. 2A-2C, the microscope fluid applicator 2 takes the immersion fluid bottle (or dropper) out of the hands of the user. With the microscope fluid applicator 2, the user only needs to rotate the turret 16 containing the microscope fluid applicator 2 into position. In one aspect of the invention, the microscope fluid applicator 2 is then raised/lowered to dispense the immersion fluid 6 onto the sample holder 20. This may be done either manually or by automatic actuation using, for example, the microscope's existing focus system. The turret 16 is then lowered (or raised as the case may be) and rotated to place the immersion fluid objective 22 into position (see FIG. 2C). For automated microscopes, the focus position of the turret 16 at which the microscope fluid applicator 2 will deliver a drop (or more) of immersion fluid 6 can be programmed into the hardware, firmware, or software of the associated controller (e.g., a computer control system). In addition, in one aspect of the invention, the delivery of immersion fluid 6 can be automated with a push of a button or switch. For example, in a computer-controlled system, a click of the mouse (or other input device) may trigger delivery of the immersion fluid 6. Alternatively, a macro or algorithm may be employed in which the fluid delivery is done independent of any additional user input. For example, a computer control system may detect the proximity of the sample holder 20 relative to the distal tip 8 of the microscope fluid applicator 2 and automatically dispense the appropriate amount of immersion fluid 6.

Still referring to FIGS. 2A-2C, in one aspect of the invention, an air objective 24 is used for low-resolution scanning of the specimen. When it is desirable to switch to an immersion fluid objective 22 such as an oil immersion objective 22, the microscope fluid applicator 2 is rotated below the specimen (or sample holder 20) and an aliquot of immersion fluid 6 is applied to the sample holder 20. Finally, the immersion fluid objective 22 is rotated under the sample holder 20 and raised to make contact with the immersion fluid 6.

The present invention may be incorporated into microscopes including, for example, research microscopes. This includes microscopes utilized for micro-fabrication, biomedical research, biotech research, cellular biology research, and bioengineering research.

While embodiments of the present invention have been shown and described, various modifications may be made without departing from the scope of the present invention. The invention, therefore, should not be limited, except to the following claims, and their equivalents.

What is claimed is:

1. A microscope fluid applicator for use with a microscope comprising:
    an immersion fluid reservoir for storing immersion fluid;
    an applicator tip coupled to the immersion fluid reservoir, the applicator tip configured in an elongate, beak shape that terminates at a distal tip;
    a ball valve disposed in the distal tip of the applicator tip, the ball valve configured to modulate flow of the immersion fluid out the applicator tip in response to contact of the ball valve with a contact surface; and
    wherein the microscope fluid applicator is releasably engageable with a moveable turret on a microscope.

2. The device of claim 1, wherein the microscope fluid applicator includes threads for releasably engaging with the moveable turret.

3. The device of claim 1, further comprising a collector for collecting excess immersion fluid dispensed from the microscope fluid applicator.

4. The device of claim 1, wherein the microscope fluid applicator is secured to an inverted microscope.

5. The device of claim 1, wherein at least a portion of the microscope fluid applicator is disposable.

6. The device of claim 5, wherein a non-disposable portion includes a housing having threads for securing the immersion fluid reservoir to a moveable turret on a microscope.

7. The device of claim 1, wherein the immersion fluid reservoir is pressurized.

8. The device of claim 1, wherein the immersion fluid reservoir is pressurized upon contact of the ball valve with the contact surface.

9. The device of claim 1, wherein the immersion fluid comprises one of oil, water, or glycerin.

10. A microscope comprising:
    a moveable turret having a plurality of objective lens ports therein;
    a microscope fluid applicator located in one of the objective lens ports, the microscope fluid applicator comprising:
        an immersion fluid reservoir for storing immersion fluid;
        an applicator tip coupled to the immersion fluid reservoir, the applicator tip configured in an elongate, beak shape that terminates at a distal tip;
        a ball valve disposed in the distal tip of the applicator tip, the ball valve configured to modulate flow of the immersion fluid out the applicator tip in response to contact of the ball valve with a contact surface; and
        a threaded portion for securing the immersion fluid reservoir to the moveable turret on the microscope.

11. The device of claim 10, further comprising means for moving the microscope fluid applicator relative to a sample.

12. The device of claim 11, wherein said movement comprises vertical movement of the microscope fluid applicator relative to a sample holder containing a sample.

13. The device of claim 10, wherein the contact surface comprises a sample holder.

14. The device of claim 13, wherein the sample holder comprises a slide, cover slip, or array of wells.

15. A method of applying immersion fluid to a sample holder for viewing with a microscope comprising:
    loading a microscope fluid applicator into a moveable turret of the microscope, the microscope fluid applicator comprising an immersion fluid reservoir configured for storing immersion fluid, an applicator tip coupled to the immersion fluid reservoir, the applicator tip configured in an elongate, beak shape that terminates at a distal tip, the microscope fluid applicator including a ball valve disposed in the distal tip of the applicator tip, the ball valve configured to modulate flow of the immersion fluid out the applicator tip in response to contact of the ball valve with a contact surface;
    rotating the moveable turret so as to position the microscope fluid applicator adjacent to the sample holder; and
    contacting the ball valve with a contact surface on the sample holder so as to dispense immersion fluid from the microscope fluid applicator onto the sample holder.

16. The method of claim 15, further comprising the step of rotating the turret to position an immersion fluid objective adjacent to the sample holder for viewing the sample.

17. The method of claim 15, further comprising the step of adjusting the vertical positioning the microscope fluid applicator relative to the sample holder.

18. The method of claim 15, further comprising the steps of unloading the microscope fluid applicator from the turret, adding additional immersion fluid to the microscope fluid applicator, and re-loading the microscope fluid applicator on the turret.

19. The method of claim 15, wherein the contact surface comprises a sample holder.

20. The method of claim 19, wherein the sample holder comprises a slide, cover slip, or array of wells.

* * * * *